(12) United States Patent
Dooley

(10) Patent No.: US 6,873,071 B2
(45) Date of Patent: Mar. 29, 2005

(54) METHOD, APPARATUS AND SYSTEM FOR CONTROLLING AN ELECTRIC MACHINE

(75) Inventor: Kevin Allan Dooley, Mississauga (CA)

(73) Assignee: Pratt & Whitney Canada Corp., Longueuil (CA)

(*) Notice: Subject to any disclaimer, the term of this patent is extended or adjusted under 35 U.S.C. 154(b) by 0 days.

(21) Appl. No.: 10/452,135

(22) Filed: Jun. 3, 2003

(65) Prior Publication Data

US 2004/0245869 A1 Dec. 9, 2004

(51) Int. Cl.⁷ ............................................. H02K 1/12

(52) U.S. Cl. ...................... 310/68 C; 310/259; 310/112

(58) Field of Search ................................. 310/254, 258, 310/259, 112, 113, 68 C, 46, 52, 66, 216–218, 191, 209

(56) References Cited

U.S. PATENT DOCUMENTS

| | | | |
|---|---|---|---|
| 3,707,638 A | 12/1972 | Nailen | 310/152 |
| 3,756,682 A | 9/1973 | Frentrop | 316/19 |
| 3,812,441 A | 5/1974 | Sakamoto et al. | 335/208 |
| 3,961,211 A | 6/1976 | Vergues | 310/686 |
| 3,989,966 A | 11/1976 | Blank | 310/68 C |
| 4,237,395 A | 12/1980 | Loudermilk | 310/113 |
| 4,250,128 A | 2/1981 | Meckling | 256/629 |
| 4,289,996 A | 9/1981 | Barnes et al. | 318/37 |
| 4,392,072 A | 7/1983 | Rosenberry | 310/216 |
| 4,401,906 A | 8/1983 | Isobe et al. | 310/156.08 |
| 4,445,061 A | 4/1984 | Jackson, Jr. | 310/156.08 |
| 4,547,713 A | 10/1985 | Langley et al. | 318/254 |
| 4,562,399 A | 12/1985 | Fisher | 322/94 |
| 4,605,874 A | 8/1986 | Whiteley | 310/268 |
| 4,638,201 A | 1/1987 | Feigel | 210/216 |
| 4,726,813 A | 2/1988 | Viscovich | 55/3 |
| 4,771,198 A | 9/1988 | Aschberger et al. | 310/68 C |
| 4,799,578 A | 1/1989 | Matsushita | 192/84.961 |
| 4,896,756 A | 1/1990 | Matsushita | 310/154.19 |
| 4,897,570 A | 1/1990 | Ishikawa et al. | 310/67 R |
| 4,924,125 A | 5/1990 | Clark | 290/52 |
| 5,030,877 A | 7/1991 | Denk | 310/114 |
| 5,184,040 A | 2/1993 | Lim | 310/259 |
| 5,235,231 A | 8/1993 | Hisey | 310/46 |
| 5,245,238 A | 9/1993 | Lynch et al. | 310/116 |
| 5,260,642 A | 11/1993 | Huss | 322/51 |
| 5,397,948 A | 3/1995 | Zoerner et al. | 60/788 |
| 5,555,722 A | 9/1996 | Mehr-Ayin et al. | 60/788 |
| 5,585,682 A | 12/1996 | Konicek et al. | 314/89 |

(Continued)

FOREIGN PATENT DOCUMENTS

| | | |
|---|---|---|
| DE | 1671038 | 10/1971 |
| EP | 617264 | 9/1994 |
| EP | 754365 | 2/1998 |
| EP | 836007 | 4/1998 |
| FR | 1555855 | 12/1968 |
| FR | 2618616 | 7/1987 |
| GB | 2 036 881 A | 12/1978 |
| GB | 2007922 | 5/1979 |
| GB | 2130806 | 6/1984 |
| WO | WO 03/028202 A1 | 4/2003 |

OTHER PUBLICATIONS

SAE Technical Paper Series 892252, Application Considerations for Integral Gas Turbine Electric Starter/Generator revisited. 1989.

Jet Engine Integrated Generator: E. Richter and T. W. Neumann, 1980.

Primary Examiner—Dang Le
(74) Attorney, Agent, or Firm—Ogilvy Renault (57) ABSTRACT

The invention includes, among its various aspects, an apparatus, method and system in which an electric machine includes at least a portion of a magnetic circuit composed of an electromagnetic material having a Curie temperature, and further includes a heating apparatus for selectively heating the portion sufficiently close to its Curie temperature to thereby regulate operation of the machine.

20 Claims, 5 Drawing Sheets

U.S. PATENT DOCUMENTS

| | | | |
|---|---|---|---|
| 5,691,589 A | 11/1997 | Keim et al. | 310/156 |
| 5,694,765 A | 12/1997 | Hield et al. | 60/37.163 |
| 5,742,106 A | 4/1998 | Muraji | 310/36 |
| 5,770,901 A | 6/1998 | Niimi et al. | 310/52 |
| 5,822,150 A | 10/1998 | Kelsic | 360/98.07 |
| 5,831,365 A | 11/1998 | Keim et al. | 310/156 |
| 5,834,874 A | 11/1998 | Krueger et al. | 310/191 |
| 5,838,080 A | 11/1998 | Couderchon et al. | 310/49 R |
| 5,847,522 A | 12/1998 | Barba | 318/269 |
| 5,867,979 A | 2/1999 | Newton et al. | 60/226.1 |
| 5,907,202 A | 5/1999 | Muraji | 310/36 |
| 5,917,248 A | 6/1999 | Seguchi et al. | 290/31 |
| 6,100,620 A | 8/2000 | Radovsky | 310/268 |
| 6,114,784 A | 9/2000 | Nakano | 310/59 |
| 6,118,194 A * | 9/2000 | Kawamura | 310/75 R |
| 6,166,469 A * | 12/2000 | Osama et al. | 310/90.5 |
| 6,265,801 B1 * | 7/2001 | Hashiba et al. | 310/214 |
| 6,313,560 B1 | 11/2001 | Dooley | 310/209 |
| 6,441,522 B1 | 8/2002 | Scott | 310/156.23 |
| 6,583,995 B2 | 6/2003 | Kalman et al. | 363/35 |
| 2002/0047477 A1 | 4/2002 | Dooley | 310/259 |
| 2002/0124561 A1 | 9/2002 | Ban et al. | 60/517 |
| 2003/0057703 A1 | 3/2003 | Howes et al. | 290/1 R |

* cited by examiner

METHOD, APPARATUS AND SYSTEM FOR CONTROLLING AN ELECTRIC MACHINE

TECHNICAL FIELD

The invention relates to the control of electric machines and, in particular, to the selective shutdown of such machines.

BACKGROUND OF THE ART

In critically important mechanical devices, such as life support systems in aircraft or medical equipment, continuous operation may be provided by redundant systems. For example, two electric motors may be coupled mechanically or controlled simultaneously to perform a function, such that each motor and its related drive circuitry are capable of individually performing the function if the other motor or drive circuitry fails.

Simple mechanical coupling of dual motors with gears for example usually includes a clutch that isolates a failed motor system from an operating motor system. To do otherwise would impose a drag or load on the operating motor, thereby reducing efficiency and available torque. When permanent magnet electric motors are used in such drive systems, the rotor of the failed system rotating in the stator can still act as an electric generator inducing current in the motor windings as a result of the rotating magnetic field (i.e.: electromagnetic drag).

However, the inclusion of any mechanical, magnetic or hydraulic clutch introduces system reliability concerns, mechanical complexity, weight, increased bulk, maintenance and increased costs. Particularly where high speed electric motors are used in aircraft applications, the relative increase in weight and complexity due to inclusion of a clutch system may be prohibitive.

It is an object of the present invention to provide improved means for isolating a failed electric machine, motor/generator, drive circuit or failed phase in a multiphase motor/generator in a mechanically coupled system.

Further objects of the invention will be apparent from the disclosure, drawings and description of the invention below.

DISCLOSURE OF THE INVENTION

The invention provides a method of operating a machine having a member composed of an electromagnetic material having a Curie temperature corresponding to a selected temperature. Magnetic flux circulation through the member is impeded when the member acquires a temperature closely approaching or exceeding the materials Curie temperature. The method involves providing a heater thermally communicating with the member, monitoring a fault detector communicating with the machine, sensing a fault condition, whereupon the heater is activated to heat the member to a temperature above the Curie temperature.

The invention further provides a single machine or multiple machine system as described above, and in particular a machine coupled to a gas turbine engine.

The invention may be implemented when only a portion or individual member of a machine's key magnetic circuit(s) is made of electromagnetic material having a Curie temperature. For example, in an electric motor/generator, the entire stator or rotor need not be of said electromagnetic material, but may only be partially so, with iron, other magnetic or non-magnetic materials also present.

The heater can be a fluid circulating through heater channels within the stator, an electrical resistance heater where the motor fault detector switch in the fault condition diverts current from the electrical input power source to the electrical resistance heater, or any other suitable heating apparatus.

The present invention is related to the inventor's U.S. Pat. No. 6,313,560, which incorporated fully into this disclosure by reference. The '560 patent teaches that the Curie point properties of machine materials may be used to provide integral thermal protection to the machine, to thereby prevent damage resulting from high temperatures caused by an internal fault. The present invention further eliminates the need for a clutch to mechanically isolate a failed motor/generator assembly or system in a coupled redundant motor system, and thereby reduces the electromagnetic drag created by the rotation of the failed permanent magnet motor/generator, through active heating of an electromagnetic material in the stator (or rotor as the case may be) to a temperature above its Curie point, thus impeding the flow of magnetic flux between the rotor and the stator of the failed motor/generator system.

DESCRIPTION OF THE DRAWINGS

In order that the invention may be readily understood, embodiments of the invention are illustrated by way of example in the accompanying drawings.

Further details of the invention and its advantages will be apparent from the detailed description included below.

DETAILED DESCRIPTION OF PREFERRED EMBODIMENTS

The present invention in one aspect allows for simultaneous application of two or more electric machines 1 such as motor/generators, mechanically coupled to a single shaft 2 capable of providing continuous operation of a load such as a compressor 3 through redundancy in the event of a failure of one machine 1.

It will be understood that the load driven by machines 1 can be any component such as an air compressor, a fuel pump, oil circulation pump or other mechanisms requiring mechanical power.

Figure 1:
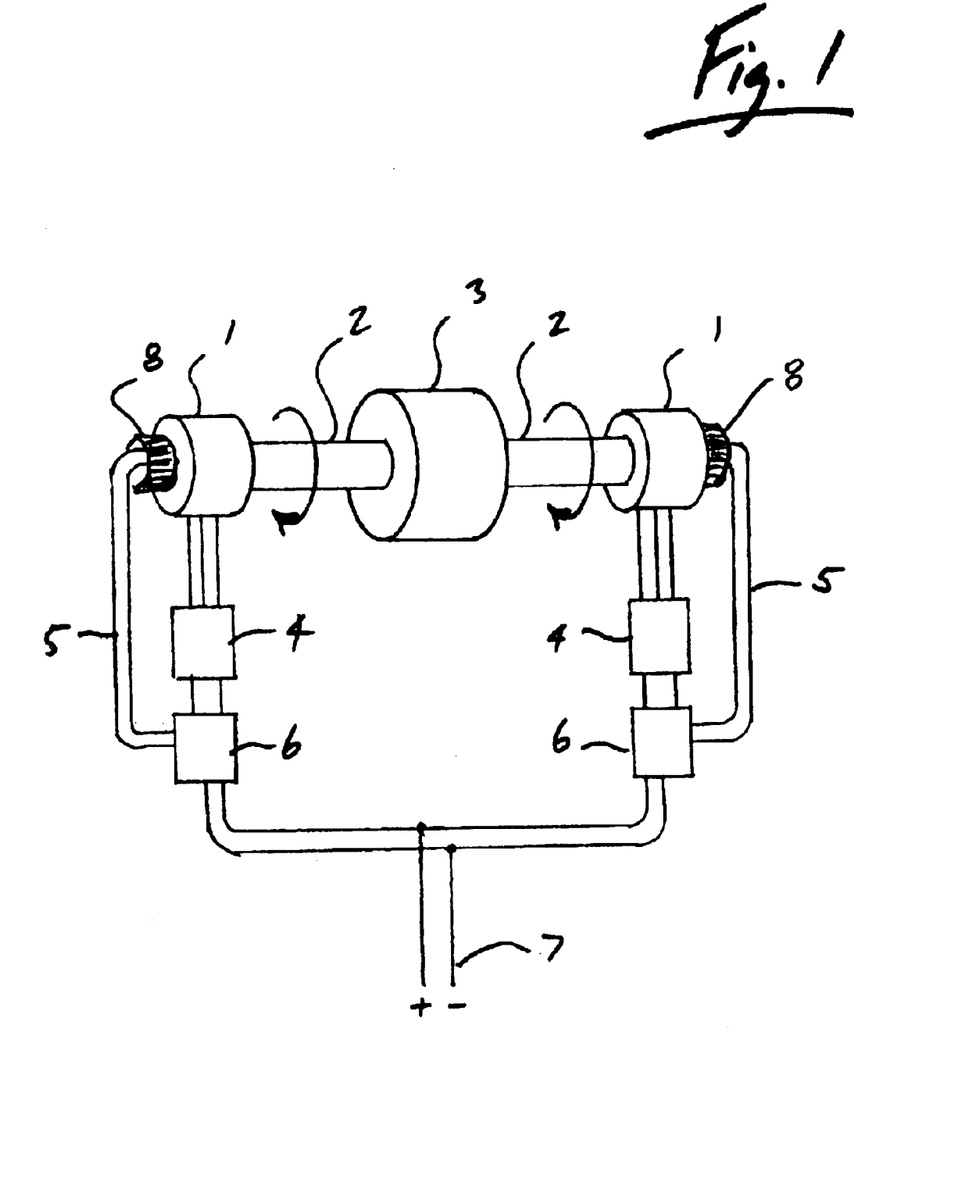
FIG. 1 is a schematic depiction of a dual motor system according to the present invention mechanically coupled to the rotary shaft of an air compressor, each motor having a controller and a motor fault detection switch powered from an electric power input source, as will be described further below.

Referring to FIG. 1, a dual electric motor system 10 is shown schematically. The system 10 includes two electric motors 1 with their power output mechanically coupled to a single shaft 2 which drives the compressor 3. Control electronics 4 are provided to control operation of each motor 1.

A motor fault detector switch 6 is disposed between each motor 1 and an electrical input power source 7. The motor fault detector switch 6 may selectively switch between a "no fault" condition and a "fault" condition, as described in detail below. Power source 7 provides motive power to the motors 1 through the drive controls 4. Heat providing means 5 and heater 8 link switch 6 to motors 1 as will be described below.

Electrical resistance heater 8 powered by electric leads 5 is thermally coupled to and, preferably, also placed within, the stator of at least one, and preferably both, of the motors 1 for use in regulating the magnetic flux circulation through the stator material, as will be described in more detail below.

Each motor 1 has a member, such as a stator or portion thereof, which forms at least a portion of a primary magnetic circuit in the motor, which is constructed of an electromagnetic material selected such that its Curie temperature corresponds to a pre-selected value. For example, a portion of the motor stator may be chosen to have a Curie temperature which is below a maximum desired operating temperature for the motor 1 such that, when the Curie temperature is approached or exceeded, magnetic flux circulation around the magnetic circuit of which the member is a part is impeded. For example, ferrites which may have a Curie temperature of approx. 215° C. are suitable for some motor designs. The Curie point is a relatively abrupt phenomenon and may be within ±3° F. of the identified Curie temperature for the material. It will be understood that the machine designer will be able to, for a given machine design, determine a maximum operating temperature and thus the select a magnetic material for inclusion in the magnetic circuit (i.e.: the stator or rotor) which has a Curie point below the maximum operating temperature. Typically, to prevent motor damage, a Curie temperature of less than about 300° C. is preferred, as disclosed by the teachings of U.S. Pat. No. 6,313,560 which, as stated, are fully incorporated herein by reference. The present invention, however, does necessarily not require that the material Curie point be below that at which a machine is damaged, though this is preferred by the inventors.

In use, in normal operation machines 1, such as motors 1, may be operated simultaneously to drive the compressor 3. Switches 6 monitor motors 1 and controlling circuitry 4 (respectively) for internal faults (such as for example: short circuit) and when no such faults are present, registers a "no fault" condition and thus permits the system to operate unaffected. In the event of a fault detected by the sensor/switch 6, the motor fault detector switch 6 thus in the 'fault' condition diverts electric current from the electrical input power source 7 to the electrical resistance heater 8 via electric leads 5. Therefore, when input power is provided to drive the still operating motor 1 (say, the motor on the left in FIG. 1), input power to the faulty motor 1 (i.e. the motor on the right in FIG. 1) is also supplied to the resistance heater to disrupt the primary magnetic circuit in the motor and thereby prevent electromagnetic drag created by the faulty motor 1.

Examined in more detail, if a fault is sensed by switch 6 it enters a "fault" condition. In this fault condition, the electrical input power source 7 is disconnected from the faulty motor 1 or system 10 by switch 6 while the other motor 1 remains connected and operating. The fault detector switch 6 then activates an appropriate mechanism as described further below, to conduct electricity across the lead 5 to activate an electric heater 8 to heat the selected Curie temperature material to a temperature at or above its Curie temperature. At this point, the magnetic flux circulation through the stator (or rotor, as the case may be) magnetic circuit is impeded, resulting from the change in the materials magnetic properties. As a result, the continued rotation of the rotor driven by the operating motor 1, and connected on shaft 2, does not result in magnetic flux circulation inside the 'dead' machine, and hence no electricity is generated and, hence, electromagnetic drag is substantially reduced.

The dual electric motor system provides for potential electrical failure of one of the motors 1 or the drive electronics 4 of one of the motors 1 without causing magnetic "lock up" of the motor combination through electromagnetic drag. Under certain conditions, such as a failed permanent magnet motor 1 that is driven by an operating second motor 1, a significant electromagnetic drag load on the un-failed motor can be avoided with the present invention since the tendency of an idle permanent magnet motor, when driven mechanically, to act as a generator of electric current can be negated. The benefits are particularly helpful if a large current flows from a driven permanent magnet motor 1 into a faulty electronics drive 4, and the requirement of additional mechanical torque from the still operating motor 1 can be avoided. This ensures that in the event of a failure condition, sufficient torque is available from the un-failed operating motor system to efficiently meet the needs of the driven system.

Such dual motor systems incorporating the invention are desirable for life support services or air craft operations due to the need for extremely high system reliability. For light weight, high power density or high speed drive systems, since provision of mechanical disconnect clutches, electromagnetic clutches or hydraulic clutches is cumbersome and increases the complexity of the system and reduces the overall system reliability by adding a further factor that may fail and further increases the cost and weight of the system, the advantages of the present invention are significant.

Figure 2:
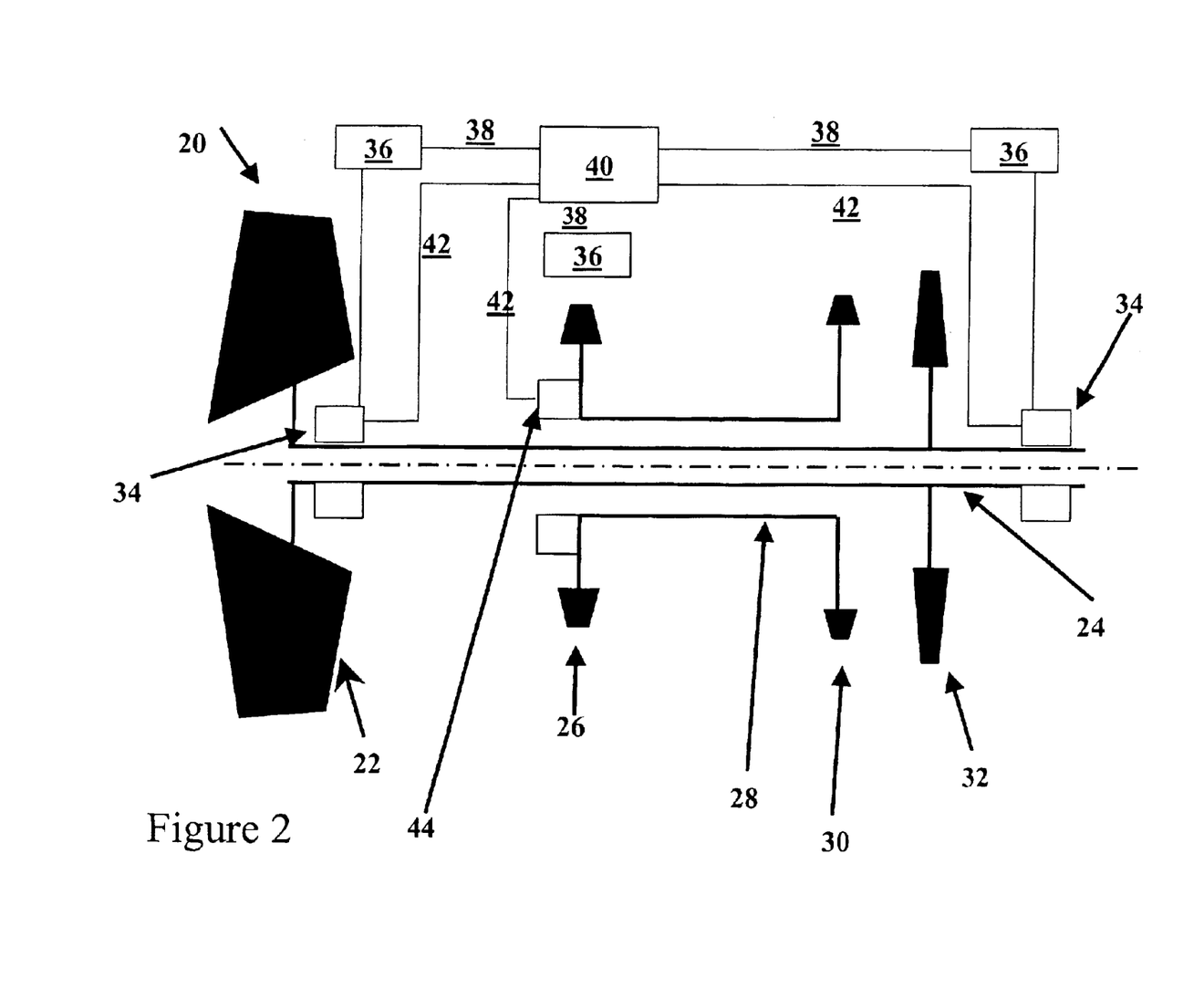
FIG. 2 is a schematic of a gas turbine engine mechanical system according to a second embodiment of the present invention having a multiple integral generator system.

Referring to FIG. 2, a second embodiment of the invention is shown. A gas turbine engine 20 having a fan 22 on a first shaft 24, a compressor section 26 on a second shaft 28, and a first turbine stage 30 on second shaft 28 and a second turbine stage 32 on first shaft 24. The skilled reader will understand that a combustor section of the gas turbine engine 20 is not shown. A plurality of electric generators 34 are connected to first shaft 24. Fault detectors 36 monitor operation of generators 34, and actuation means 38 connect to an engine heat source 40 which communicates with generators 34 by an appropriate heat transfer apparatus 42, as will be described further below. A third generator 44, present on second shaft 28 will be described in more detail below.

In use, during steady state operation, combustion in the combustor portion (not shown) causes the turbine stages 30 and 32 to rotate, thus driving shafts 24 and 28, which in turn drive compressor portion 26 and fan 22, respectively, as is well understood. Rotation of shaft 24 also drives generators 34 to generate electrical power for use by gas turbine engine 20 or elsewhere on a host aircraft. All the while, fault detectors 36 monitor the operation of generators 34 and their related control systems for the unlikely occurrence of an internal fault condition or other machine fault.

Should a generator 34 or related control system experience a fault, the appropriate fault detector will sense the fault and send a signal via 38 to an engine heat source, such as bleed air from compressor section 26, or oil from engine 20's oil system, which may be circulated via an appropriate heat transfer apparatus (as described in the inventor's co-pending application, Ser. No. 10/393,252, filed Mar. 21, 2003, the teachings of are hereby fully incorporated into this disclosure by reference). For example, upon an appropriate signal by a fault detector 36, an appropriate valve mechanism (not shown) permits a heat transfer fluid (e.g. bleed air, engine oil, etc.) to be fed via conduits 42 to the low-Curie point member of the magnetic circuit the affected generator 34. The skilled reader will understand that the heat transfer fluid will be of a sufficient temperature to cause the low-Curie point member of the affected generator 34 to be heated to approaching, equal or above its Curie point, thus effectively "shutting down" the magnetic circuit in the generator 34. The affected generator is thus safely and quickly taken offline.

Figure 3:
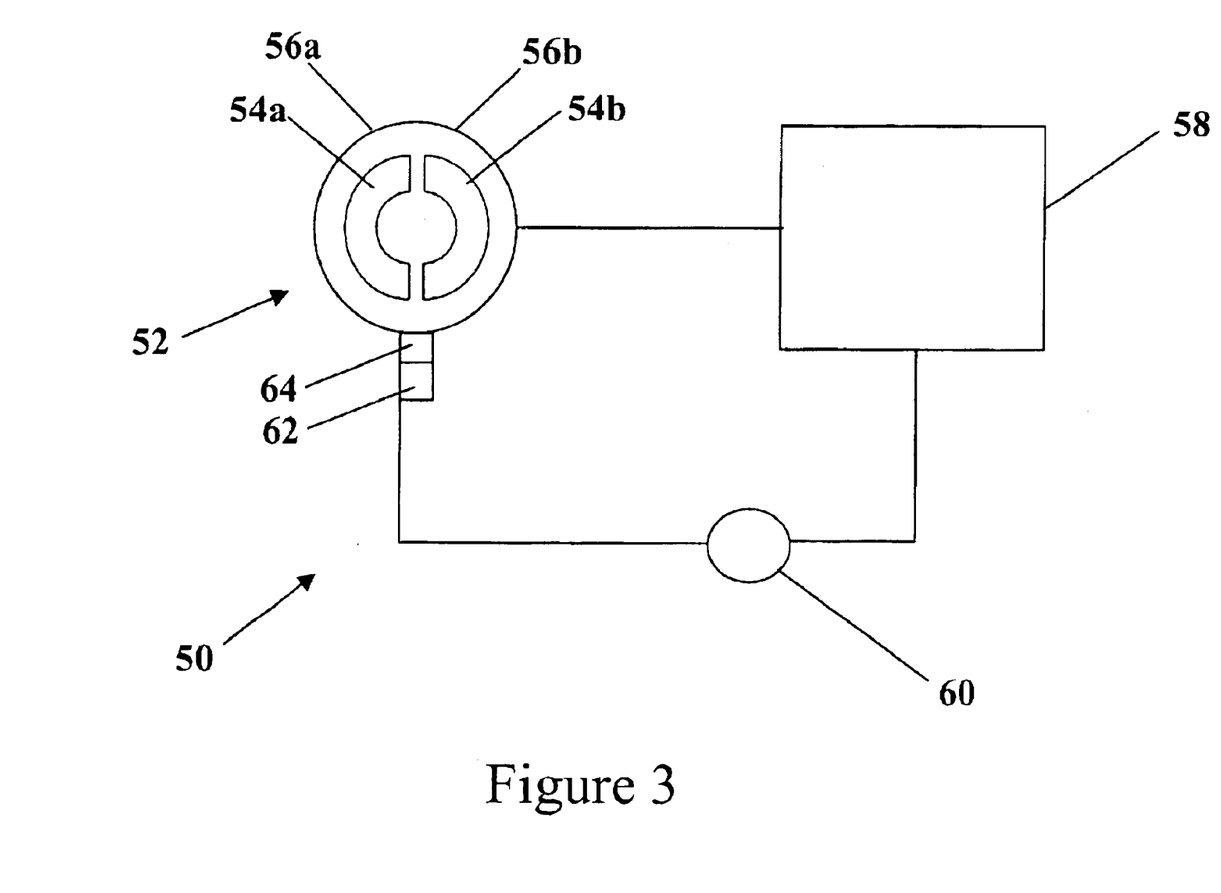
FIG. 3 is a schematic of a third embodiment of the invention showing a single electric machine system with split construction.

Referring to FIG. 3, a third embodiment is disclosed. In this embodiment, a single electric machine system 50 is disclosed. System 50 includes a machine 52, which has a "split" construction in that it includes independent winding sets 54a and 54b within associated stator portions 56a and 56b, respectively. As is described in the inventor's co-pending application Ser. No. 10/444,952 filed May 27, 2003 and entitled "ARCHITECTURE FOR ELECTRIC MACHINE", the contents of which are fully incorporated by reference into this disclosure, winding set 54a and 54b are independently controllable within stator section 56a and 56b such that machine 52 is essential two machines 52 within one casing (not shown). Machine 52 is connect to an associated system 58 (for example, a mechanical load) and a power source 60. (It will be understood that power source 60 may be a source of mechanical or electrical power, depending on whether machine 52 is to be operated as a motor or a generator. An integral fault sensor 62 and heater 64 are provided within machine 52. In operation and in the presence of a fault in either winding 54a or 54b, or is associated systems, heater 64 may be appropriately activated to heat the associated low Curie point stator section 56a/56b, as the case may be, to deactivate that subsystem within machine 52. Referring again to FIG. 2, generators 34 and/or 44 may have a split construction of the type described here, with the associated components described, as will be understood by the skilled reader.

Figure 4:
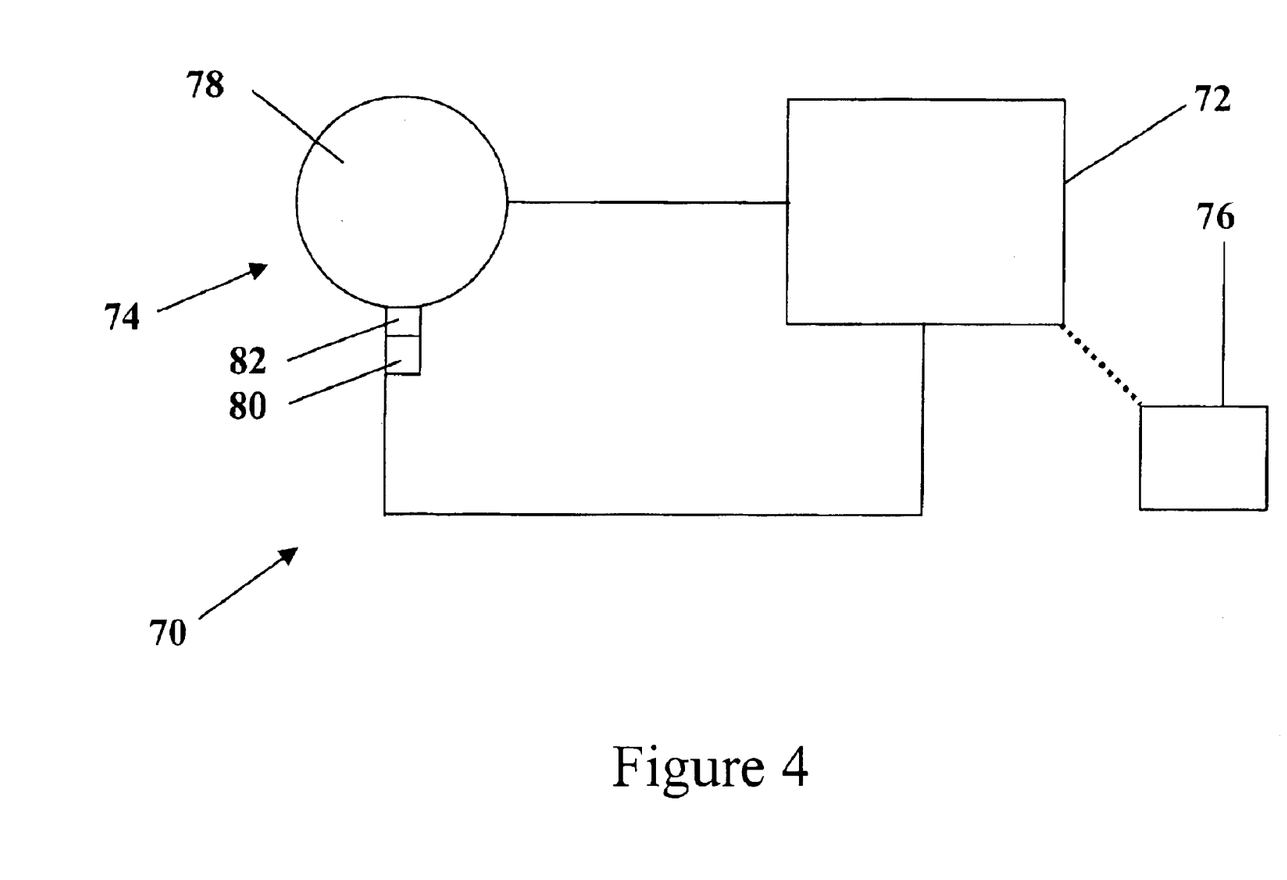
FIG. 4 is a schematic of a fourth embodiment of the invention showing a single motor shut off system.

Referring to FIG. 4, a fourth embodiment is disclosed. In this embodiment, a single motor "shut-off" system 70 is disclosed. In system 70, a load 72 (such as a compressor, pump or the like) is alternately driven by an electric motor 74 and a non-electric drive 76 (such as an auxiliary gearbox, or other non-electrically driven apparatus). Electric motor 74 includes a low Curie point material as a portion of its principal magnetic circuit, as described above, and preferably includes such a material as a portion of its stator core. A sensor 80 and heating apparatus 82 are connected to motor 74 to deactivate motor 74 in the event of a desired shut down. (It will be understood that, in all embodiments, an associated machine may be controlled according to the present invention, and that the existence of a fault as the control criterion is merely one example of a desired control condition). Optionally, sensor 80 may also communicate a signal to the appropriate clutch (not shown) to engage the non-electric drive means. Referring again to FIG. 2, generators 34 and/or 44 may be (additionally or alternately) independently controlled as described here, as will be understood by the skilled reader.

As an alternative to the electrical heater described above, the heater may involve a fluid, such as heated oil or a gas that is circulated through the machine in channels within the machine. In a fault event, the fault detector switch would activate opening and closing of a fluid valve or diverter.

It will be understood that the invention can be applied to a single machine or multiple machines (including the dual arrangement of FIG. 1), as well as any electric machine such as a motor, generator or alternator. Any suitable construction of electric machine may be used, such as wound rotor, permanent magnet, switched reluctance, alternating current or direct current, etc. Any suitable heating apparatus may be used. The application of the invention is not limited to internal fault situations, but rather the invention may be used in any type of clutching or shut-down scheme. The switching and sensing arrangements are intended to be illustrative and exemplary only. The present invention could be implemented with an integral or remote, automatic or non-automatic sensing and actuation means.

Figure 5:
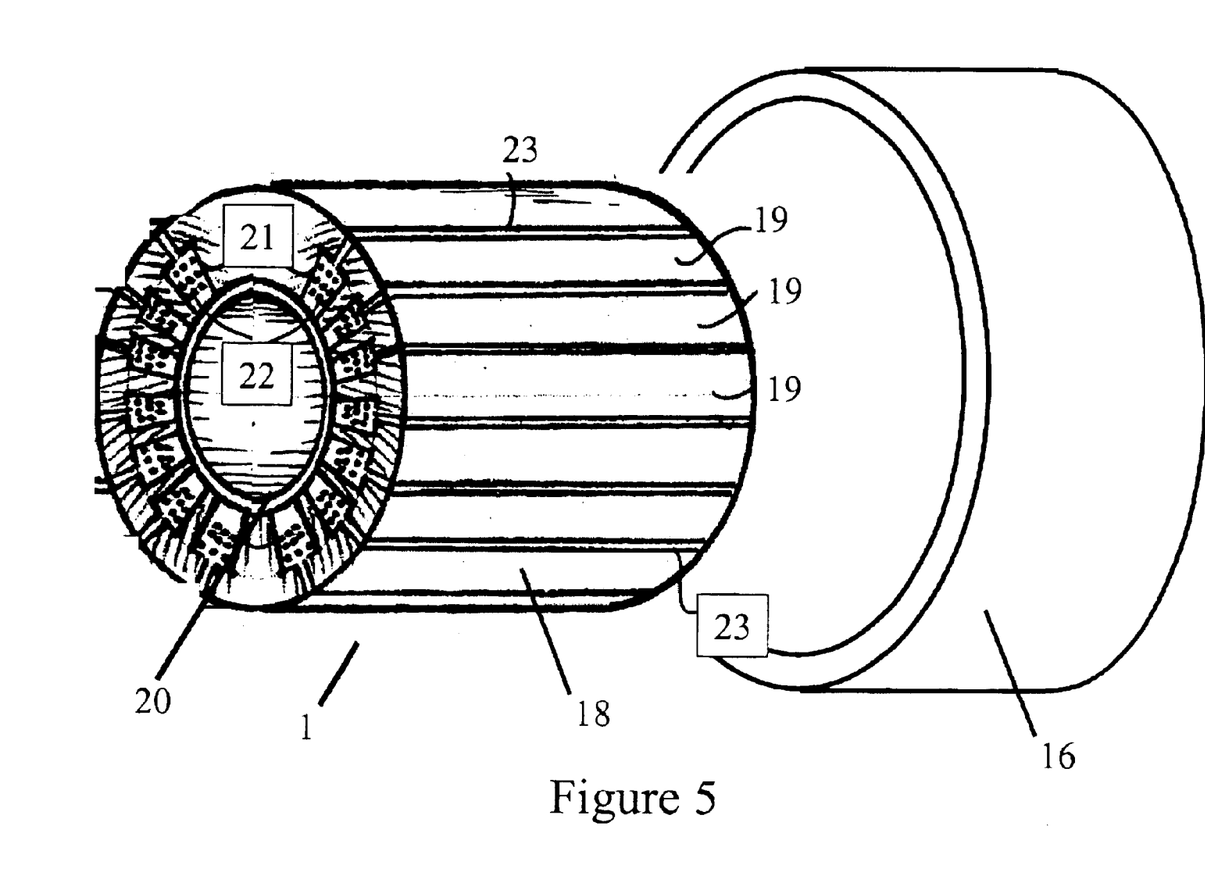
FIG. 5 is an isometric view of an electric machine incorporating the invention.

FIG. 5 shows an embodiment of a machine 1 having a rotor 16 and stator 18 with T-shaped members 19 mounted to a cylindrical back-iron 20 defining an array of stator slots 21 housing conductor windings 22 separated by a slot gap 23. In a three phase motor/generator the windings of every third slot 21 is part of a separately controlled circuit or phase. In one embodiment, the rotor 16 includes a portion made of a material having a pre-selected Curie point material, and the heating apparatus communicates with a portion of the rotor to affect the rotor magnetic circuit as desired, as described above. In another embodiment, the stator (i.e. members 19 and back-iron 20) is made of a material having a pre-selected Curie point material, and the heating apparatus communicates with stator to affect the rotor magnetic circuit as desired, as described above. Preferably, cylinder 50 is formed of a "soft" ferrite having a Curie temperature in the neighborhood of 200° C. A ferrite having such property is, for example, a Manganese-Zinc available from Phillips under material type 3C85, having a Curie temperature of 215° C. Of course, other materials may be suitable, and will be easily identified by those of ordinary skill in the art. Preferably the material will have a Curie temperature within the normal operating temperature range of an electric machine—i.e. between 95° C. and 350° C., more preferably less than 300° C., and such material will be selected based on the correspondence of its Curie temperature with the desired 'shut-down' temperature.

Still referring to FIG. 5, In yet another embodiment, only a portion of the stator includes the describe Curie point material, and thus each phase in a multiphase machine can be separately controlled according to the invention by selecting the Curie point properties of the materials used for only a portion of the stator—i.e. one or more of the T-shaped members 19. For example, if two adjacent T-shaped members 19 that define the slots 21 of a phase are of material that has a Curie point temperature pre-selected to be within the range of the heating apparatus, a heater (not shown in FIG. 5) can be used as described above to shut down one or more phases, or portions of phases in those particular slots 21. The present invention may therefore provide much more that fault-shutdown clutching, but rather permits sophisticated control of a machine.

Although the above description relates to a specific preferred embodiments as presently contemplated by the inventor, it will be understood that the invention in its broad aspect includes mechanical and functional equivalents of the elements described herein.

I claim:

1. A permanent magnet electric machine comprising:
   at least one magnetic circuit including a rotor, a stator, at least one winding disposed in the stator and a member made of an electromagnetic material having a Curie temperature; and
   a heating apparatus thermally coupled to the member and adapted to selectively heat the member at least substantially to said Curie temperature to thereby regulate magnetic flux circulation in the at least one magnetic circuit.

2. A permanent magnet machine according to claim 1, further comprising a fault detector adapted to sense a fault condition in the machine and send a signal for activation of heating apparatus upon sensing said fault.

3. A permanent magnet machine according to claim 1, wherein said Curie temperature is below the maximum desired operating temperature of the machine.

4. A permanent magnet machine according to claim 1, wherein the heating apparatus is selected from the group comprising an electrical resistance heater and a circulated heated fluid.

5. A permanent magnet machine according to claim 1, wherein the machine is mechanically coupled to a gas turbine engine.

6. A system comprising:
   at least two electric machines with their power output mechanically coupled together, at least one machine having:
      a permanent magnet rotor, a stator and at least one winding disposed in the stator, together at least partially defining at least one magnetic circuit,
      a member partially comprising the magnetic circuit, the member formed of a material having a Curie temperature; and
      an apparatus thermally coupled to the member and adapted to selectively heat the member to at least substantially said Curie temperature to thereby substantially shut down electrical operation of the machine.

7. A system according to claim 6, further comprising a sensor operatively communicating with the apparatus, the sensor being adapted to activate the apparatus upon sensing a sensed condition.

8. A system according to claim 7, wherein the sensed condition is selected from the group comprising: a short-circuit in said at least one machine; an internal fault in said at least one machine; a fault in a control circuitry of said at least one machine; a signal from a controller for the system; and a signal from a manual switch.

9. A system according to claim 6, wherein the Curie temperature of the member is below a maximum desired operating temperature of said at least one machine.

10. A gas turbine engine comprising:
   a gas generator having at least one rotating shaft driven by the gas generator; and
   at least one machine rotatably connected to the shaft for at least one of driving and being driven by the shaft, the machine including a rotor, a stator and at least one winding, the rotor including a plurality of permanent magnets mounted thereon, the rotor, stator and winding at least partially defining at least one magnetic circuit, the at least one magnetic circuit comprised at least in part of a material having a Curie temperature, the at least one machine further comprising heating means for selectively heating the electromagnetic material to at least said Curie temperature.

11. A gas turbine engine according to claim 10, further comprising fault detecting means for sensing an internal fault in the at least one machine, the fault detecting means also communicating with the heating means and adapted to, upon sensing a fault, effect activation of the heating means to thereby heat the electromagnetic material to its Curie temperature, thereby substantially affecting electrical activity in the at least one machine.

12. A gas turbine engine according to claim 10, wherein the at least one machine comprises two machines mounted to the shaft.

13. A gas turbine engine according to claim 10, further comprising an electric machine mounted to a second shaft of the gas turbine engine.

14. A gas turbine engine according to claim 10, wherein the electromagnetic material is a soft ferrite.

15. A gas turbine engine according to claim 10, wherein the electromagnetic material has a Curie temperature less than 350 degrees Celsius.

16. A method of operating a permanent magnet machine, the machine having a rotor, a stator and at least one winding, the rotor and stator together defining a magnetic circuit, at least a portion of the magnetic circuit being made of a material having a Curie temperature, the machine further including a heating apparatus, the method comprising the steps of:
   causing a magnetic flux to circulate the magnetic circuit to thereby induce one of an output current in the at least one winding and an output torque;
   selectively activating the heating apparatus to heat the at least a portion of the magnetic circuit to a temperature sufficiently close to said Curie temperature to impede said magnetic flux circulation in the magnetic circuit.

17. A method according to claim 16, further comprising the step of sensing a fault condition, and wherein the step of selectively heating is performed in response to the step of sensing a fault condition.

18. A method according to claim 16, wherein the step of selectively heating includes circulating a fluid through channels within the machine and controlling a temperature of said circulated fluid.

19. A method of operating a system having two electric machines mechanically coupled to a common rotatable shaft, the machines each having a permanent magnet rotor, a stator and at least one winding, the rotor and stator together defining a magnetic circuit adapted to induce an output current in the at least one winding, at least a portion of the magnetic circuit being made of a material having a Curie temperature, the method comprising the steps of:
   driving the shaft;
   monitoring the machines for the occurrence of a fault; and
   upon sensing a fault in an affected one of said machines, heating the at least a portion of the magnetic circuit of the affected machine to said Curie temperature.

20. A method according to claim 19, wherein the shaft is at least initially driven by both machines.

* * * * *